J. T. MOORE & R. K. HAWLEY.
Improvement in Construction of Rafts.
No. 124,504. Patented March 12, 1872.
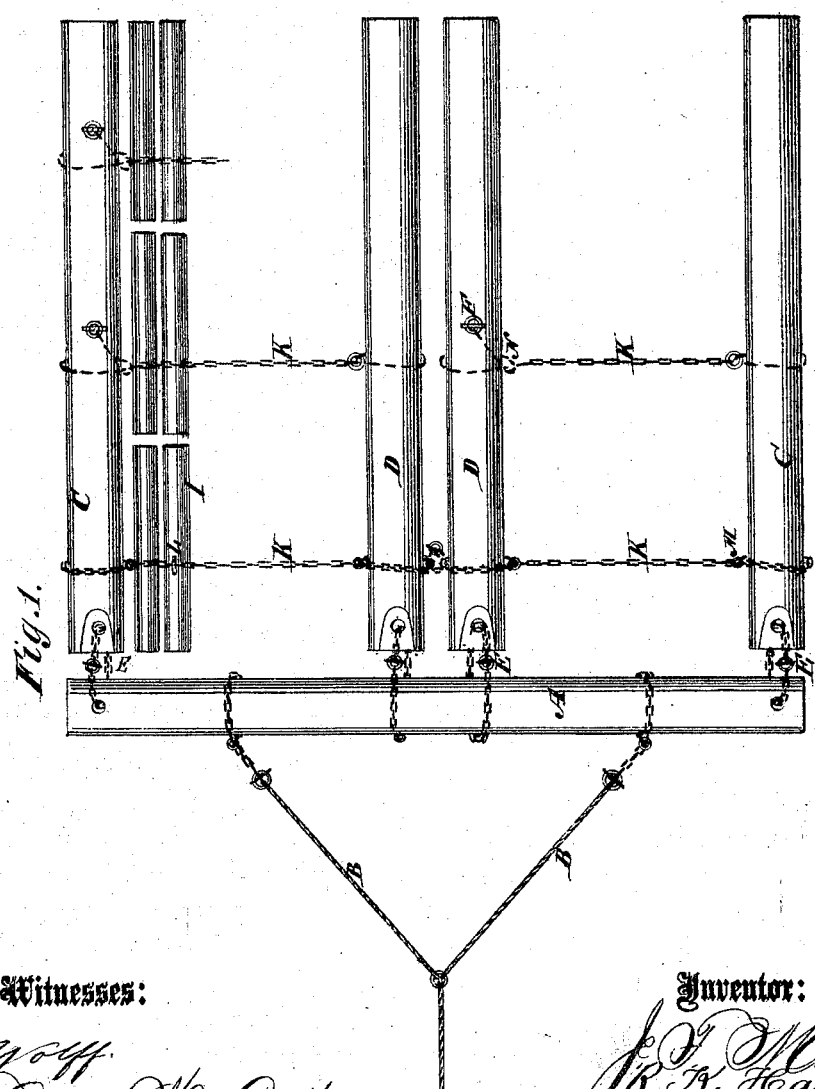

UNITED STATES PATENT OFFICE.

JOHN T. MOORE, OF HAVRE DE GRACE, AND RAVAND K. HAWLEY, OF BALTIMORE, MARYLAND.

IMPROVEMENT IN CONSTRUCTION OF RAFTS.

Specification forming part of Letters Patent No. 124,504, dated March 12, 1872.

Specification describing certain Improvements in the Construction of Rafts, invented by JOHN F. MOORE, of Havre de Grace, in the county of Harford and State of Maryland, and RAVAND K. HAWLEY, of Baltimore, in the county of Baltimore, State of Maryland.

As ordinarily or heretofore constructed, rafts have not been able to withstand the severe strain incident to transit across the larger lakes or ocean bays during rough weather; and the object of our invention is to so connect the logs of the ordinary length with a skeleton of booms as to enable the raft thus formed to be towed in heavy waves or seas with perfect security. To this end, we employ screw-eye bolts to secure the logs to the chains which connect the parallel booms, so that they may play thereon or have the free movement necessary to allow the raft as a whole the capacity to rise and fall or otherwise conform to the motion of the waves. The screw-bolts are likewise easily inserted or removed, do not materially injure the lumber, are strong and durable, and have little friction on the chains or ropes. We also make use of a new chain-hitch or mode of fastening the booms or logs together, whereby greater security is obtained without a complicated arrangement or tedious process of manipulating to adjust the same.

Figure 1 is a plan view of our improved raft; Fig. 2 represents our improved method of fastening booms or logs together by the ends; and Fig. 4 represents the eye and T-bolts used in constructing the raft.

Similar letters of reference indicate corresponding parts.

A represents the log or spar at the head of the raft, to which the towing-gear B is connected; also, the booms C, forming the sides of the raft; also, other booms, D, at the center. The logs of these booms C D are flattened at the ends, and have a hole, through which a chain, E, is passed, which chain passes through a hole in the towing-log if at the end, or around it if at the center, and is fastened together by a ring and T. Any number of logs will be connected together in these booms according to the required size of the raft. Our improved mode of fastening the booms together endwise is shown in Fig. 2. The chain has four rings, through the end ones, H H, of which T-bolts are screwed into the respective booms, and thence the chain passes through rings G, so as to form a "slip-noose" around the end of each boom. Between these booms we secure the logs I, by means of chains, K, extending from one boom to another and passing through eye-bolts, L, screwed into them, the said chains being connected to the booms by passing around them and through a ring, M, or being tied as shown at N, and secured by a T-bolt, F, screwing through the ring in the end. Thus connected with the booms the logs move laterally or endwise with all necessary freedom and with little friction on the rope or chain, while escape is next to impossible under any strain to which the roughest water can subject them, either in being towed or at anchor. The head spar or boom serves as a breakwater for the raft when being towed, and forms a smooth or rounded front, which facilitates its passage through the water.

Having thus described our invention, what we claim is—

1. In a raft the screw-eye bolts L, chains K, and booms C D, combined as shown and described, and for the purpose specified.

2. The mode of connecting boom logs by means of a chain, C', provided with the rings G G and H H, and applied to the adjacent ends of the logs by passing around them and secured at its ends by means of bolts, as shown and described.

JOHN T. MOORE.
RAVAND K. HAWLEY.

Witnesses:
S. H. REASIN,
A. S. ADAMS.